United States Patent [19]

Linn

[11] 4,269,097

[45] May 26, 1981

[54] SLITTER HAVING MEANS TO ADJUST SLITTER POSITION ON MOUNTING SHAFT

[75] Inventor: S. Stephen Linn, Marlton, N.J.

[73] Assignee: Molins Machine Company, Inc., Cherry Hill, N.J.

[21] Appl. No.: 893,728

[22] Filed: Apr. 5, 1978

[51] Int. Cl.[3] .................... B23D 19/00; B23D 19/06

[52] U.S. Cl. .................... 83/482; 83/499; 83/504; 493/370

[58] Field of Search .................... 83/482, 499, 498, 504, 83/508.3, 425.4, 479–481, 500–503; 93/58.2 R

[56] References Cited

U.S. PATENT DOCUMENTS

| | | | |
|---|---|---|---|
| 1,642,081 | 9/1927 | Munroe | 83/482 X |
| 2,285,846 | 6/1942 | Stocker | 83/482 |
| 2,395,950 | 3/1946 | Wolff | 83/482 |
| 3,332,326 | 7/1963 | Haas | 83/482 X |
| 3,587,374 | 6/1971 | Stewart | 83/499 X |
| 3,760,697 | 9/1973 | Besemann | 83/425.4 |
| 4,033,217 | 7/1977 | Flaum et al. | 83/425.4 |

*Primary Examiner*—J. M. Meister

*Attorney, Agent, or Firm*—Seidel, Gonda, Goldhammer & Panitch

[57] ABSTRACT

A corrugated paperboard slitter has at least one rotatable shaft with a plurality of slitter or scorer heads slideably received on the shaft. A means is provided adjacent each of the shafts for positioning heads individually or as a group by way of a shifter. A mechanism moves the shaft between an operative slitting or scoring position and an adjusting position wherein the heads can be engaged by the positioning means.

10 Claims, 9 Drawing Figures

SLITTER HAVING MEANS TO ADJUST SLITTER POSITION ON MOUNTING SHAFT

BACKGROUND OF THE INVENTION

Automatic slitter scorers which include either a computer or miniprocessor have been proposed heretofore. See U.S. Pat. Nos. 3,651,723 and 4,010,677. Other prior art directed to automated slitter scorers include U.S. Pat. Nos. 3,961,547; 3,646,418; 3,831,502; and 3,587,374. In such slitter scorers, heads are moved along a shaft to a predetermined position and then are secured to the shaft for rotation therewith. It is known to simultaneously couple the shaft to all of the operative heads as per U.S. Pat. Nos. 3,951,024 and 4,006,671 instead of coupling each head individually to the shaft. In U.S. Pat. Nos. 4,033,217, a mechanism for selectively adjusting a plurality of heads on a slitter scorer is disclosed. In U.S. Pat. No. 4,033,217, the slitter scorer shafts are rotatable about stationary axes while the head adjusting devices are movable toward and away from the heads. Since the slitter scorer shafts of U.S. Pat. No. 4,033,217 are rotatable about stationary axes, the positions of the shafts cannot be adjusted to accommodate paperboard of various thicknesses.

SUMMARY OF THE INVENTION

The present invention relates to a slitter and preferably to a corrugated paperboard slitter-scorer. A rotatable slitter shaft has a plurality of heads slideably received thereon. A means for selectively positioning the heads in predetermined locations along the shaft is provided. There is also provided a means for moving the shaft between an operative position and an adjusting position wherein the heads can be engaged by the positioning means.

In the preferred embodiment, a pair of rotatable slitter shafts are disposed one above the other. The positioning means includes a discrete shifter associated with each shaft and guided for movement along a path parallel to the longitudinal axes of the shafts. A drive means is provided for moving each shifter along said path. Each shifter supports a finger for coupling a side of the shifter to one of the heads.

In a preferred embodiment, the positioning means includes a rotary mounting means for the slitter shaft. The slitter shaft is rotatably received within a crankarm. A stub shaft is fixedly secured to the crankarm. The rotation of the stub shaft pivots the crankarm and thereby moves the slitter shaft from its operating position to its adjusting position.

It is an object of the invention to provide a slitter with a means for selectively adjusting the heads on a slitter shaft.

It is another object of the present invention to provide a slitter with a means for moving the slitter shaft from an operative position to an adjusting position wherein the heads on the shaft can be moved by an adjusting means.

Other objects will appear hereinafter.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

Figure 1:
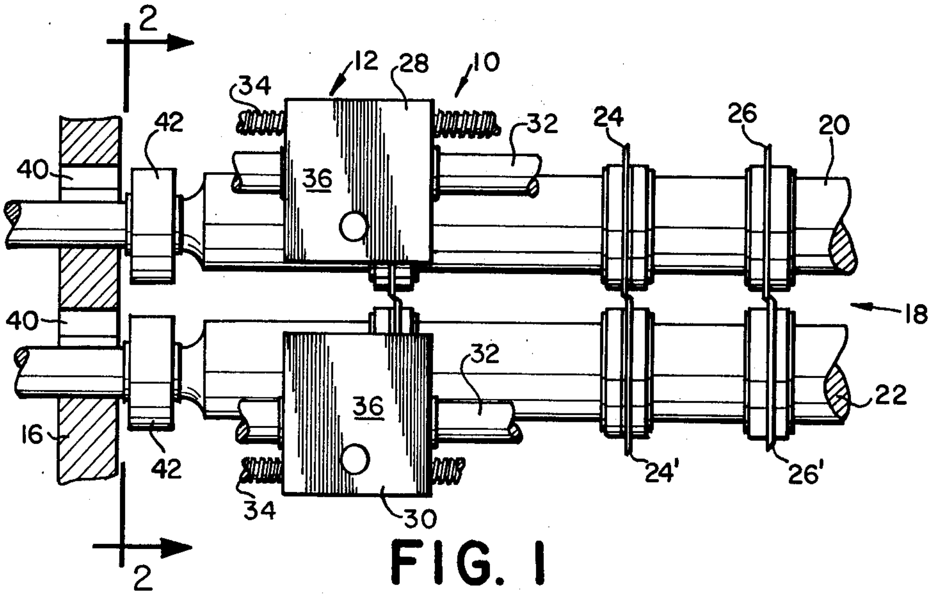
FIG. 1 is an elevational view of a portion of the slitter shaft and the head position mechanism.

Referring to the drawings in detail, wherein like numerals indicate like elements, there is shown in FIG. 1 a a portion of a slitter in accordance with the present invention designated generally as 10. The slitter 10 may be part of a slitter scorer positioned between the discharge end of a rotary shear and the inlet end of a cut-off of a paperboard corrugator. The details of a rotary shear and a cut-off are conventional and well known in the art and, hence, will not be described in detail.

The apparatus 10 includes a pair of side frames 16, one of which is shown in FIG. 1. The frame 16 supports a slitter unit 18. A scorer unit (not shown) may be disposed downstream of unit 18.

A web such as a web of corrugated paperboard is supported as it moves from the discharge end of a rotary shear to the apparatus 10 by way of a web table. After a web has been processed by the slitter unit 18, it is carried by way of another web table to a cut-off mechanism.

Figure 2:
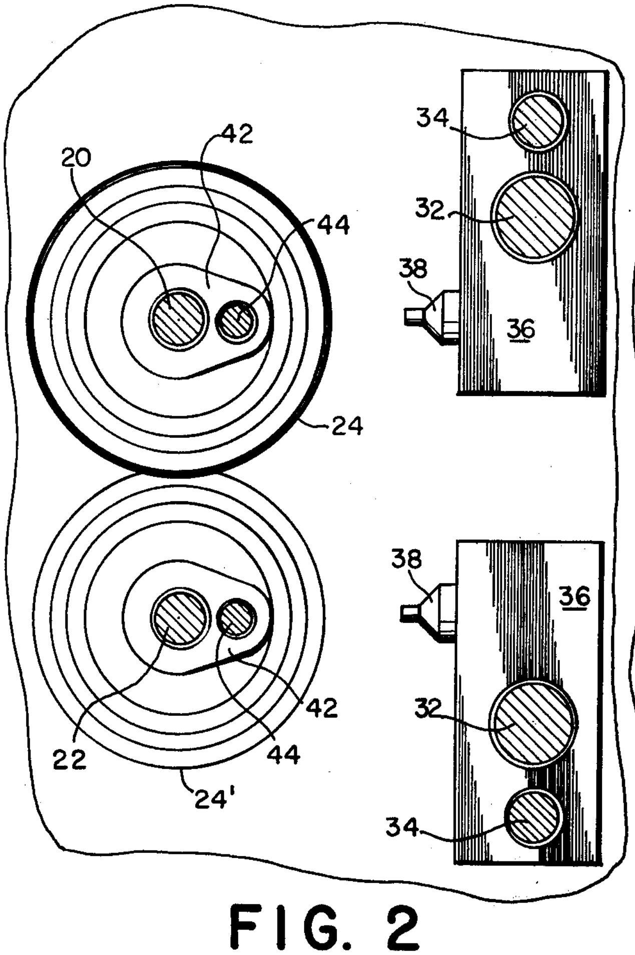
FIG. 2 is a view taken along line 2—2 of FIG. 1 illustrating the slitter shaft in its operative position.

The unit 18 includes an upper head support shaft 20 and a lower head support shaft 22 which are parallel to one another and horizontally disposed. Each of the shafts 20, 22 have a plurality of slitting heads thereon. Thus, for purposes of illustration, shaft 20 has slitting heads 24 and 26 thereon. Shaft 22 has an equal number of mating heads 24′, 26′. As shown in FIGS. 1 and 2, the mating heads overlap one another. Each of the shafts 20, 22 generally has at least three slitting heads. A discrete head positioning means 12 is disposed adjacent each of the shafts 20, 22.

The shafts 20 and 22 are constructed in a similar manner. A friction drag and lock means is provided for holding the heads 24, 26 in position along the shaft 20. While the heads 24, 26 are in the process of being positioned, the friction drag means holds the heads 24, 26 in position where no substantial axial force affects the heads 24, 26. At the same time, the friction drag means allows the positioning means 12 to move the heads 24, 26 along the shaft 20. Once all of the heads 24, 26 have been positioned for a particular run, the lock means firmly secures the heads 24, 26 in position. The friction drag and lock means does not form part of the invention and hence will not be described in detail herein. A suitable friction drag and lock means is disclosed in the currently pending application Ser. No. 814,749 of Robert E. Coburn for "A Head Locking Means For Automatic Slitter Scorer" filed on July 11, 1977, now U.S. Pat. No. 4,162,643.

The positioning means 12 includes a shifter 28 guided for movement along a path parallel to the longitudinal axis of shaft 20, and a shifter 30 is guided for longitudinal movement along a path parallel to the longitudinal axis of the shaft 22. The shifters 28, 30 are identical in construction and hence only shifter 28 will be described in detail with like numerals indicating like elements.

The shifter 28 is guided for movement by way of rod 32 which extends between the frames 16. The shifter 28 is propelled along the rod 32 in opposite directions in any suitable manner such as by way of a threaded rod 34 threadedly coupled to the shifter 28 and driven by one of a pair of motors having a clutch therebetween. One of the motors is preferably a large high speed motor such as 1 Hp for moving shifter 28 at a high speed such as 10 cm/sec while the other motor is a small motor such as ¼ Hp for moving shifter 28 at a slow rate such as 0.6 cm/sec. An encoder on rod 34 is coupled to a computer which in turn is coupled to the clutch. Per se, such clutch, computer and motors are well known in the art.

The shifter 28 has a body 36 received about each of the shafts 32, 34. A finger 38 is fixedly supported by the body 36. As the shifter 28 moves along its guide rod 32, it causes the heads on shaft 20 to be shifted along shaft 20 depending upon the position of the shaft 20 relative to the finger 38 and the position of the finger 38.

Figure 4:
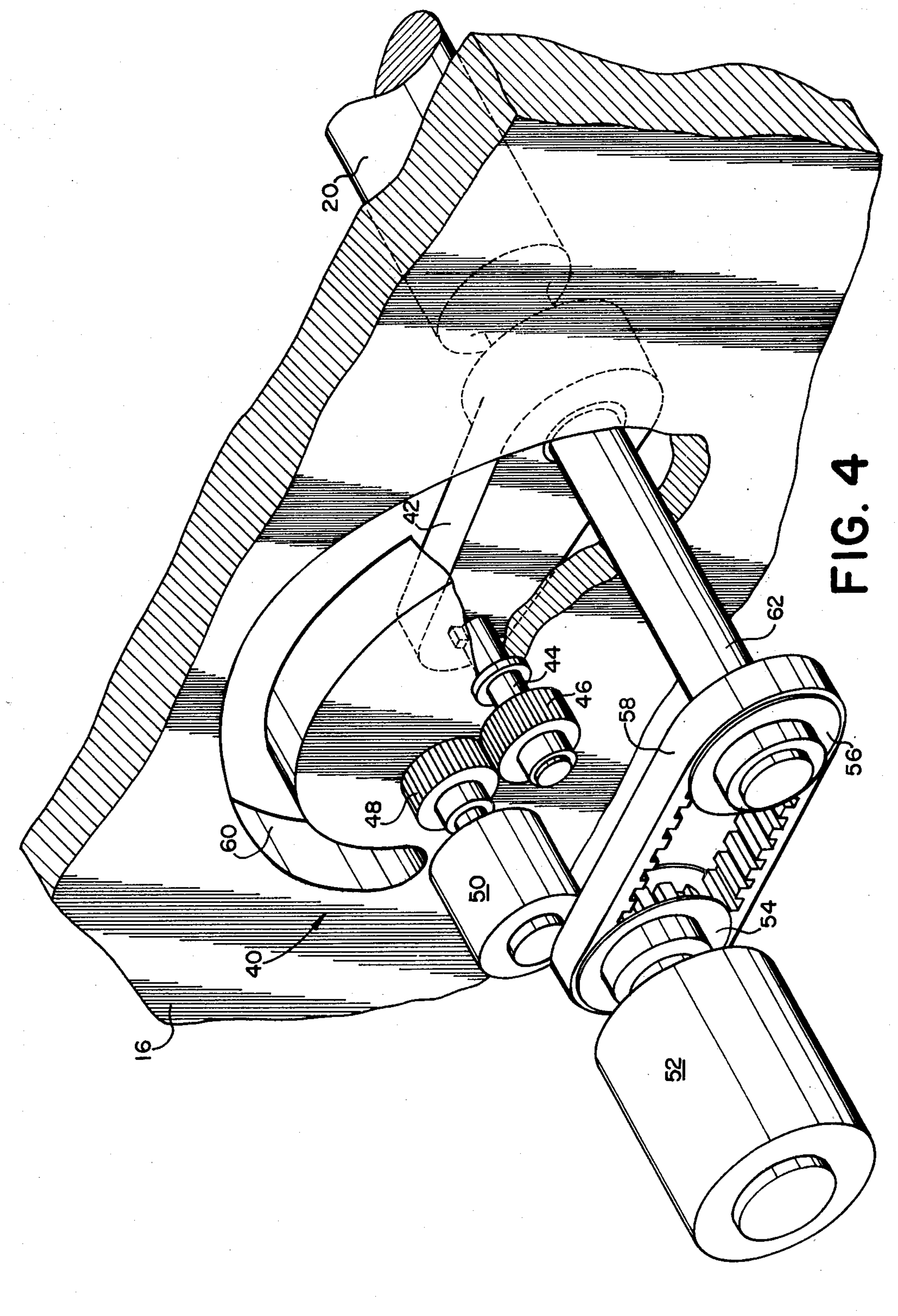
FIG. 4 is a perspective view of the rotary drive mechanism for the slitter shaft.

A means for pivoting the shafts 20, 22 is designated generally as 40. The means 40 is associated with each shaft 20, 22. The means 40 are identical and hence only one means 40 associated with shaft 20 will be described. FIG. 4 best illustrates the means 40.

The shaft 20 may pivot up to 180°, but preferably the motion of the shaft is just sufficient to provide contact between the heads and the pins 38, 38'. Each of the side frames 16 is provided with an arcuate slot 60 to provide clearance for the extension 62 of shaft 20 as it pivots reciprocally along slot 62 between the operating position and the head adjusting position.

The means 40 pivots the shaft 20 between an operative position wherein the shaft 20 can be rotatably driven to perform a slitting operation on a web of a paperboard and an adjusting position wherein the heads 24, 26 can be engaged by the pin 38 of the adjusting means 12. The means 40 includes an arm 42. The shaft 20 passes through a hole in the arm 42 and is freely rotatable therein. A stub shaft 44 is fixedly secured to the arm 42 at a distance spaced from the shaft 20 and is rotatably supported by a bearing extending through frame 16. The stub shaft 44 is generally parallel to the shaft 20. The stub shaft 44 is rotatably driven by any suitable means such as gear wheel 46 coupled to motor 50 by way of drive gear 48 and a clutch mechanism.

The shaft 20 is driven by a separate motor 52. The motor 52 is drivingly coupled to the shaft 20 by means of a pair of gear wheels 54, 56. The gear wheels 54, 56 are spaced from one another and coupled together by a timing belt 58. The gear wheel 54 is preferably coaxial with the gear wheel 46 of the shaft 44.

Figure 3:
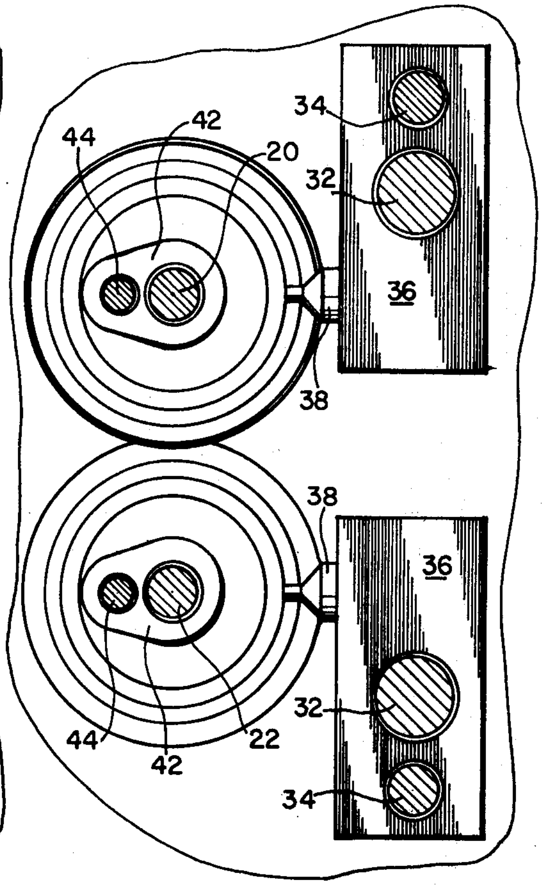
FIG. 3 is a view taken along line 2—2 of FIG. 1 illustrating the slitter shaft in its head adjusting position.

In order to pivot the shaft 20 between its operative posiposition and its adjusting position, the motor 50 drives the stub shaft 44 through 180°. The rotation of stub shaft 44 pivots the arm 42 which carries the shaft 20 between its operative and adjusting positions. To provide support for the shaft 20 at its opposite end, a similar means 40 can be provided. The length of the timing belt 58 and the space between the gear wheels 54, 56 is chosen such that the shaft 20 is free to move between its operative and adjusting positions. Once the shaft 20 is in its adjusting position, the heads 24, 26 can be engaged by the pins 38 and then be moved by the adjusting means 12. See FIG. 3.

Referring to FIGS. 5A–5E, there is diagrammatically illustrated the sequence for setting the heads by the shifter 28 in connection with pivoting the shaft 20. Since the pivoting of shafts 20 and 22 is substantially the same except for direction, the description will be restricted to shaft 20.

Figures 5A, 5B, 5C, 5D, 5E:
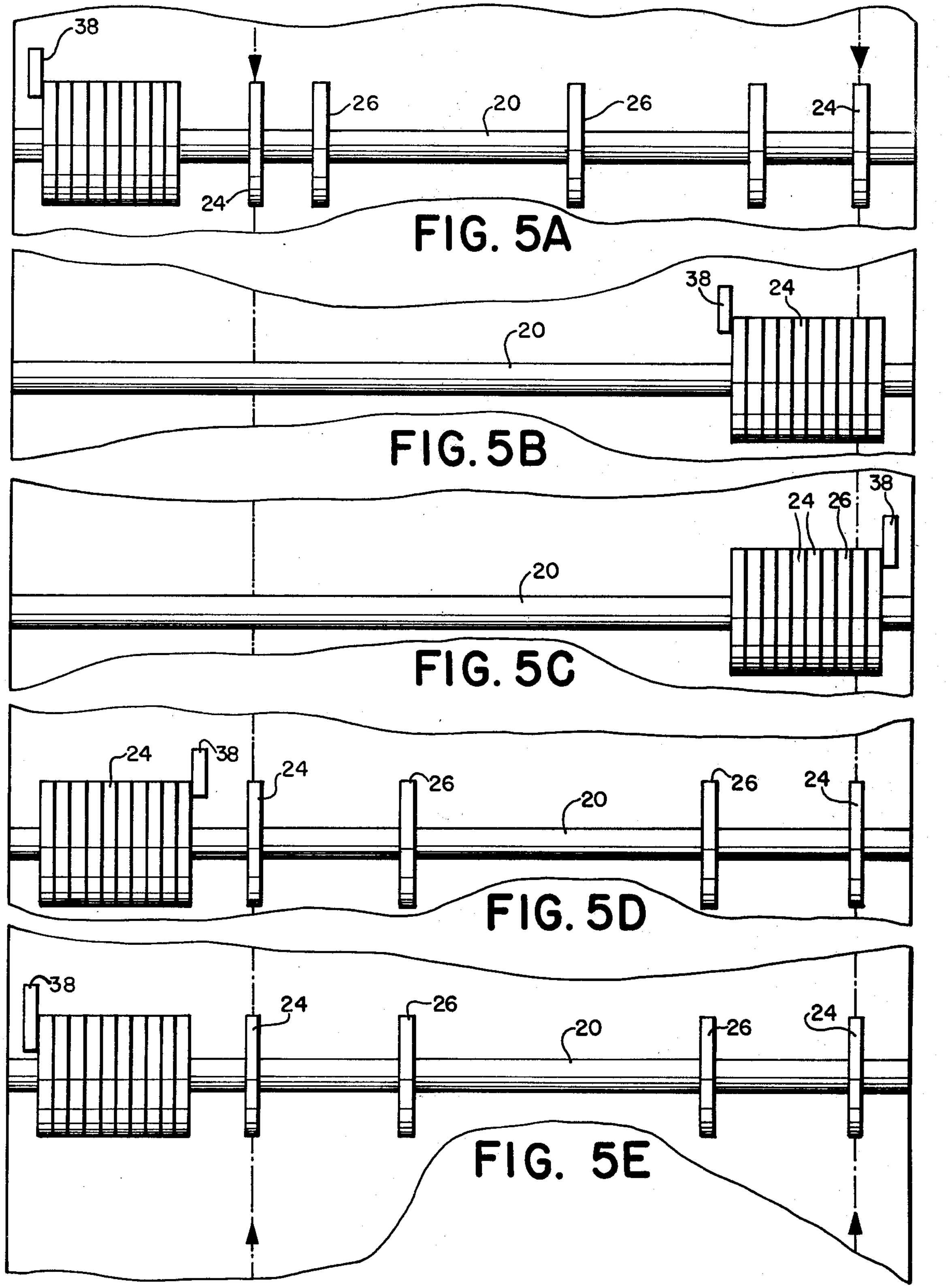
FIGS. 5A–5E represent schematic illustrations of the manner in which the heads are moved.

Assume that the shafts are in the operating position shown in FIG. 2. Shaft 20 will be pivoted clockwise to move it into the position shown in FIG. 3 wherein the heads are in interference with pin 38. Likewise shaft 22 is revolved counterclockwise to bring its heads into interference with pin 38'. The shifter 28 and the shifter 30 move from left to right as shown in FIG. 5A, moving all the heads to the right side after the head locking means has been disengaged.

The shaft 20 then pivots counterclockwise for a sufficient distance to provide clearance between pin 38 and the heads. The shifter 28 moves farther to the right to bring the pin 38 into the position shown in FIG. 5C. The shaft 20 is pivoted clockwise again to bring the heads and pin 38 into the position shown in FIG. 5C. The screw 34 is rotated to move the shifter from right to left to the to the operating position for the first head as shown in FIG. 5D.

The shaft 20 is again pivoted to disengage the pin 38 and the heads. The shifter then moves the width of one head and the shaft 20 is pivoted backwards to engage the heads with the pin 38. The shifter moves from right to left to the operating position of the head next to the first head 24.

By alternately pivoting the shaft and engaging successive heads, the operating heads are deposited in their respective operating positions. If any heads are to be idle, they are moved to the extreme left hand position shown in FIG. 5E. Then, with the heads in the orientation shown in FIG. 5E, the locking means locks the heads to the shaft in their operative positions. The shaft 20 is now ready for the next production run. Simultaneously, the heads on shaft 22 would have been moved likewise.

As reflected by the state of the art, printer slotters which are controlled by computers, minicomputers and/or a microprocessor are known. Conventional programs may be used to cause the movement of the shifter 28 and/or actuation of the means 40 using open loop circuits having an accuracy of approximately 0.015 inches. In view of the present state of the art and the detailed discussion above, no description of operation is deemed necessary. While the present invention has been described in conjunction with a slitter shaft, it is equally applicable for use with a scorer shaft.

Since the shafts 20, 22 are pivotable, the vertical distance between the heads is adjustable to accommodate different thicknesses of paperboard within the range of overlap of the mating heads. For a web of increased thickness, motor 50 may pivot shaft 20 upwardly from the position in FIG. 2 through an arc of 3° to 10°. Since pin 38 does not move toward and away from head 24, the shifting means 12 and its control are materially simplified.

The present invention may be embodied in other specific forms without departing from the spirit or essential attributes thereof and, accordingly, reference should be made to the appended claims, rather than to the foregoing specification as indicating the scope of the invention.

What is claimed is:

1. Apparatus comprising a frame, a rotatable shaft supported by said frame, a plurality of heads slideable along said shaft, means for selectively positioning said heads in predetermined locations along said shaft, said positioning means being supported by said frame for movement only in a direction parallel to the longitudinal axis of said shaft, said shaft having an operative position wherein said positioning means is incapable of moving said heads and an adjusting position wherein said heads are sufficiently close to said positioning means wherein they can be engaged by said positioning means, and means for pivoting said shaft about an axis parallel to its longitudinal axis between said operative position and said adjusting position, means for rotatably driving said shaft, said driving means permitting movement of said shaft between said operative position and said adjusting position.

2. Apparatus in accordance with claim 1 wherein said shaft pivoting means includes a crank arm mounting means for said shaft and means for rotating said crank-arm mounting means.

3. Apparatus in accordance with claim 2 wherein said crankarm mounting means includes at least one arm, said shaft being rotatably carried by said arm, a stub shaft fixedly secured to said arm, said stub shaft being parallel to and spaced from said first mentioned shaft, and drive means for rotating said stub shaft.

4. Apparatus in accordance with claim 1 including a second shaft disposed below said first mentioned shaft, a plurality of heads slideable along said second shaft, said positioning means including a discrete shifter associated with each shaft, each shaft and its associated shifter remaining at all times to one side of the web to be slit.

5. A slitter in accordance with claim 4 wherein each shaft pivoting means includes a crankarm mounting means for said slitter shafts and means for rotating said crankarm mounting means.

6. A slitter in accordance with claim 5 including a means for rotatably driving each slitter shaft, said driving means permitting the movement of said slitter shaft between said slitting position and said adjusting position, and wherein said crankarm mounting means includes at least one arm, said slitter shaft being rotatably carried by said arm, a stub shaft fixedly secured to said arm, said stub shaft being parallel to and spaced from said slitter shaft, and drive means for rotating said stub shaft.

7. A slitter in accordance with claim 4 wherein the upper shaft pivots upward from its slitting position and the lower shaft pivots downwardly from its slitting position whereby the pivoting means for said shafts can adjust the vertical distance between the shafts at their slitting position to accommodate different thicknesses of a web to be slit.

8. In a slitter apparatus comprising a frame, a pair of rotating slitter shafts disposed one above the other, a plurality of mating heads slideable along each shaft for slitting a web therebetween, drive means for rotatably driving said shafts, means for selectively positioning said heads in predetermined locations along said shafts, said positioning means including a discrete shifter associated with each shaft, each shaft and its associated shifter remaining at all times to one side of the web to be slit, each shifter being guided only for movement along a fixed path parallel to said shafts, and means for pivoting at least one shaft between a slitting position and an adjusting position wherein the heads of said one shaft can be engaged by said positioning means, said one shaft being pivotable by said pivoting means in a direction so as to change the vertical distance between said shafts so that webs of different thickness can be accommodated within the range of overlap of the mating heads and without interfering with the driving relation between said drive means and said shafts.

9. Apparatus comprising a frame, a rotatable shaft supported by said frame, crank arm mounting means for said shaft for pivoting said shaft about an axis parallel to its longitudinal axis between an operative position and an inoperative position, means for rotating said crank arm mounting means, means for rotatably driving said shaft, said driving means permitting movement of said shaft between the operative and inoperative positions, said driving means including a gear wheel fixedly attached to said shaft and a belt coupling said gear wheel to a motor, the length of said belt being sufficient to allow said shaft to pivot between the operative position and the inoperative position, said crank arm mounting means including at least one arm, said shaft being rotatably carried by said arm, a stub shaft fixedly secured to said arm, said stub shaft being parallel to and spaced from said shaft, and drive means for rotating said stub shaft.

10. In a slitter apparatus comprising a frame having two opposed sides, a pair of rotatable slitter shafts disposed one above the other between the sides of said frame, a plurality of heads positionable along each shaft for slitting a web disposed therebetween, means for selectively positioning said heads in predetermined locations along said shafts, said positioning means including a discrete shifter associated with each shaft, each shaft and its associated shifter remaining at all times to one side of a web to be slit, each shifter being guided for movement along a fixed path parallel to said shafts, crank arm mounting means for each shaft for pivoting each shaft between a slitting position and a head adjusting position, means for rotating said crank arm mounting means, drive means for each slitter shaft, a gear wheel fixedly attached to each slitter shaft, a belt coupling each gear wheel to a motor, and the length of each belt being sufficient to allow each slitter shaft to be moved between its slitting and adjusting positions.

* * * * *